(12) United States Patent
Inoue et al.

(10) Patent No.: US 6,282,306 B1
(45) Date of Patent: *Aug. 28, 2001

(54) X-RAY IMAGE DETECTING APPARATUS AND IMAGE READING APPARATUS

(75) Inventors: Hitoshi Inoue; Akio Saigusa, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/529,437

(22) Filed: Sep. 18, 1995

(30) Foreign Application Priority Data

Sep. 21, 1994 (JP) .................................................. 6-254647

(51) Int. Cl.[7] ....................................................... G06K 9/00
(52) U.S. Cl. ............................................ 382/132; 382/168
(58) Field of Search .................................... 382/128–134, 382/168; 600/410; 250/370.08, 370.09, 584; 378/46, 62–63; 370/278, 282, 365; 358/405

(56) References Cited

U.S. PATENT DOCUMENTS

| | | | |
|---|---|---|---|
| 4,960,993 | 10/1990 | Shigyo et al. ...................... | 250/327.2 |
| 5,164,993 | * 11/1992 | Capozzi et al ....................... | 382/132 |
| 5,198,669 | * 3/1993 | Namiki et al. ........................ | 250/587 |
| 5,574,284 | * 11/1996 | Farr .................................. | 250/370.06 |
| 5,656,818 | * 8/1997 | Nyg.ang.rd ....................... | 250/370.09 |
| 5,790,710 | * 8/1998 | Price et al. .......................... | 382/255 |

FOREIGN PATENT DOCUMENTS 0335419   10/1989   (EP) ............................... H04N/1/40

OTHER PUBLICATIONS

"Digital Image Processing", R.C. Gonzales, Jun. 30, 1992, Addison–Wesley Publishing Co., U.S.A., pp. 173–180.

* cited by examiner

Primary Examiner—Jay Patel
(74) Attorney, Agent, or Firm—Fitzpatrick, Cella, Harper & Scinto

(57) ABSTRACT

An image reading apparatus includes an image reading portion for outputting image data of an image read, and a signal processing portion for receiving the image data from the image reading portion and outputting a signal to an external device. The signal processing portion includes an image data transmitting system for transmitting the image data from the image reading portion as is, a histogram system for producing data concerning a histogram from the image data from the image reading portion and a histogram transmitting system for transmitting the data concerning the histogram produced by the histogram system in parallel with the image data transmitting system. Alternatively, an X-ray detecting apparatus including an X-ray image detecting portion for outputting image data of a detected image may be utilized in place of the image reading apparatus.

20 Claims, 5 Drawing Sheets

X-RAY IMAGE DETECTING APPARATUS AND IMAGE READING APPARATUS

BACKGROUND OF THE INVENTION

1. Field of the Invention

The present invention relates to an X-ray image detecting apparatus for detecting an X-ray image, particularly a medical X-ray image, to convert it into a digital image, and an image reading apparatus for reading a general image to digitize it.

2. Related Background Art

Recently, attempt have actively been made to digitize a medical image, particularly an X-ray fluoroscopic image, and to apply it to an electronic filing or automated diagnosis system.

A known example of a device for digitizing a X-ray image is a X-ray image detecting apparatus which is so arranged that X-rays transmitted by a subject are guided onto a fluorescent screen, a storage-type solid state image sensing device such as a CCD receives fluorescence emitted in proportion to X-ray intensity from the fluorescent screen to convert it into video signals, and thereafter the video signals are converted to digital values. There are other apparatus using a device for directly converting X-ray amounts into charge amounts without utilizing fluorescence. Also preferably utilized is a film digitizer which optically reads an image on an X-ray film taken and developed and which converts it into a digital image.

Generally, digital images used in medical diagnosis require delicate density information, and therefore, digital values used therefor are of 12 to 16 bits corresponding to gradients of 4096 to 65536.

However, the digital medical images often have distributions of gradients not effectively distributed over the entire range of the above digital values, but rather are concentrated in a part of the range. If such digital images are displayed on a display apparatus, for example, such as a CRT, images with low contrast are displayed because the display apparatus itself has a lower capability of gradation expression than films.

Thus, the X-ray image detecting apparatus is arranged to output obtained digital data to an external arithmetic unit, to produce a histogram of densities in the arithmetic unit, normally to measure a distribution of frequencies of the image data, to detect an effective range of digital values of the image data, and to produce a data conversion table for expanding the effective range to the entire range of the digital values, that is, to produce a look-up table. To display high-contrast images becomes possible by converting the digital values of image data referring to such a look-up table.

The goal is to automate diagnosis with medical images in order to increase efficiency and accuracy of mass health screening etc., and thus, the histogram is one of the most important information tools in image diagnosis.

Normally, a medical image is composed of a large quantity of pixels, about 2000×3000 (6 millions). The conventional example as described above is, however, arranged to produce the histogram by outputting the digital data pixel by pixel from the X-ray image detecting apparatus to the external arithmetic unit, which takes a significant amount of time, and thus greatly lowers the operation efficiency when handling many images.

SUMMARY OF THE INVENTION

In view of the above conventional example, an object of the present invention is to provide an X-ray image detecting apparatus and an image reading apparatus that can improve operation efficiency without forcing a load, for example, a load by producing the histogram, on the external arithmetic unit.

Other objects of the present invention will become apparent in the description of embodiments to follow.

DESCRIPTION OF THE PREFERRED EMBODIMENTS

The present invention is explained in detail, based on the embodiments illustrated in FIG. 1 to FIG. 6.

Figure 1:
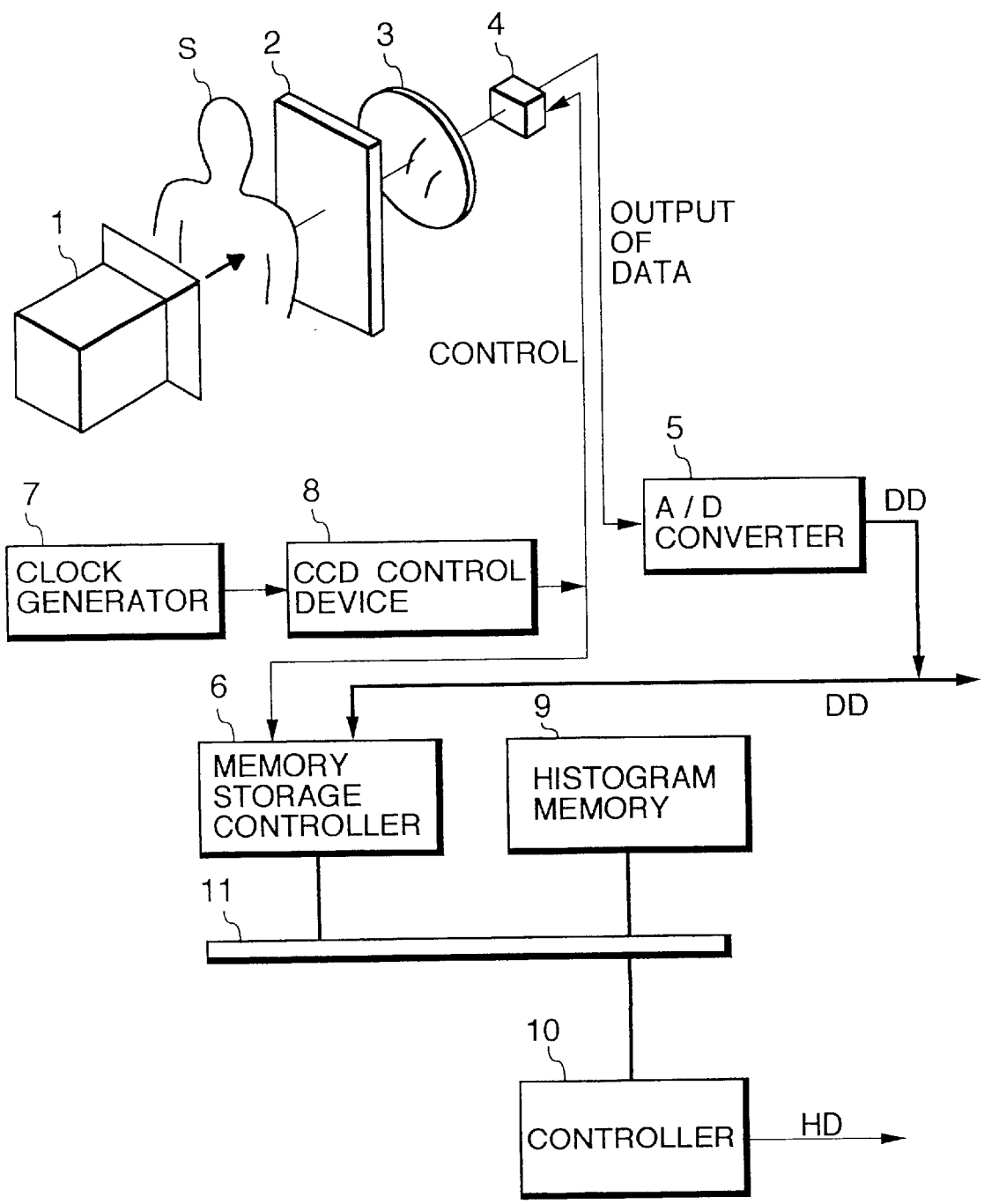
FIG. 1 is a structural drawing of a first embodiment.

FIG. 1 is a structural drawing of an X-ray image detecting apparatus of the first embodiment, in which an X-ray generator 1 emits X-rays toward a subject S in an irradiation direction represented by an arrow and in which a fluorescent screen 2, an optic lens 3, and a CCD image sensor 4 are arranged in order on the opposite side to the generator 1 with respect to the subject S in the irradiation direction of the X-rays.

The output of the CCD image sensor 4 is connected through an A/D converter 5 to an interface to an external device and a memory storage controller 6, and outputs of a clock generator 7 for generating a basic clock, and a CCD control unit 8 are connected in series to the input side of the CCD image sensor 4. The output of the CCD control unit 8 is also connected to the memory storage controller 6. Further, the memory storage controller 6, a histogram memory 9, and a controller 10 for controlling the entire system are connected to each other through a signal bus 11. The CCD image sensor 4 has about six million pixels, the A/D converter 5 has the 12-bit configuration, and a histogram memory 9 has a 24-bit configuration and 4096 addresses. These addresses correspond to respective gradients, and numerical values stored in the addresses correspond to frequencies of digital values corresponding to the gradients.

To take an X-ray image in the form of digital data, the controller 10 first outputs a control signal through the signal bus 11 to the histogram memory 9 to initialize all numerical values stored in the histogram memory 9 to zero, and thereafter drives the X-ray generator 1 to generate X-rays. X-rays transmitted by the subject S irradiate the fluorescent screen 2, whereby the fluorescent screen 2 radiates beams of fluorescence proportional to intensities of X-rays. The optic lens 3 condenses the fluorescence beams on the pixels in the CCD image sensor 4, which stores the light information in the form of charges.

The CCD control unit 8 outputs control pulses to the CCD image sensor 4 and the memory storage controller 6 in synchronization with the basic clock from the clock generator 7. In the CCD image sensor 4, a charge amount of each pixel is output as a voltage value to the A/D converter 5 every control pulse, and the A/D converter 5 converts each voltage value to digital data DD indicating a certain numerical value. This digital data DD is transmitted to the interface connected to an external device, is also output as an address value to the memory storage controller 6, and further is stored as image data in a memory device such as a frame memory, not shown.

The memory storage controller 6 controls the signal bus 11 to take data in from the same address in the histogram memory 9 as an address of each address value in synchronization with the control pulses from the CCD control unit 8, and then adds 1 to the data to again write the result in the same address. A numerical value stored in an address in the histogram memory 9 corresponds to a frequency of a gradient represented by the address. Accordingly, an image obtained through the CCD image sensor 4 is converted into a digital image and at the same time, a histogram thereof is produced in the histogram memory 9.

After reading the image data from the memory device, not shown, the controller 10 reads the histogram data HD stored in the histogram memory 9 and then outputs it with the image data through the interface to the external device.

In the present embodiment the charge amounts obtained by the CCD image sensor 4 are directly converted to the digital data DD, but they may be converted to the digital data DD after effecting correction of light-quantity unevenness of the fluorescent screen 2, optic lens 3, etc., and correction of variations in conversion efficiency between the pixels in the CCD image sensor 4.

The A/D converter 5 can be selected not only from those handling 12-bit digital values, but also from those handling an arbitrary-number-of-bits digital values. Further, the number of bits of the histogram memory 9 does not always have to be 24 bits. In most cases, a sufficient number is about 16 bits, and thus, the number of bits of the histogram memory 9 can be decreased to this level of bit number. With the thus decreased bit number, the digital values could overflow in the histogram memory 9, and become necessary to be saturated, which will rarely affect the shape of histogram.

In the present embodiment, an address in the histogram memory 9 is used for one digital data DD, but the present invention is not limited to such a relation of correspondence. For example, a mean value may be obtained from each 50 or so digital data DD for one gradient. The histogram can be produced using such mean values as address values, whereby an amount of histogram data HD can be greatly decreased while rarely damaging the shape of the histogram.

Although this embodiment produced the histogram of the entire image obtained by the CCD image sensor 4, the histogram may be produced by only an image of a portion necessary for diagnosis in order to decrease the data amount of the histogram data HD.

Figure 2:
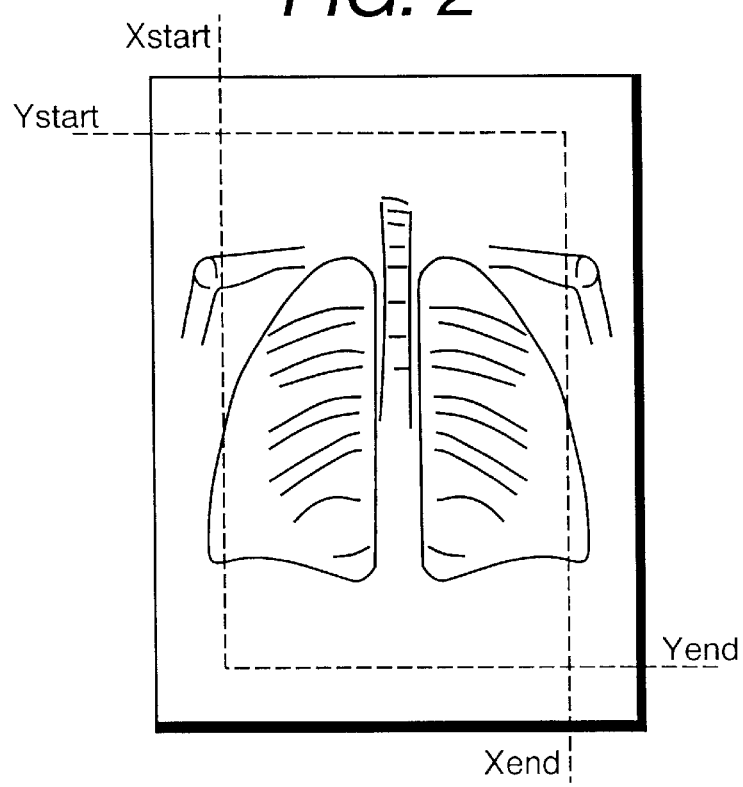
FIG. 2 is an explanatory drawing of an image obtained through a CCD image sensor.

FIG. 2 shows the entire image taken in the CCD image sensor 4, and with respect to this image, a region necessary for diagnosis is only a rectangular portion indicated by the dashed lines, which is a region surrounded by four straight lines Xstart, Ystart, Xend, and Yend. Accordingly, position information of the region surrounded by the straight lines Xstart, Ystart, Xend, Yend represented by the dashed lines is preliminarily stored as numbers of control pulses from the CCD control unit 8 in the memory storage controller 6, the memory storage controller 6 counts control pulses from the CCD control unit 8 upon producing the histogram, and based on this pulse number, positions of pixels where the digital data DD output from the A/D converter 5 are obtained are monitored, whereby only data obtained from the pixels inside the dashed lines shown in FIG. 2 out of the digital data DD can be used as address values.

Further, the present embodiment outputs the shape of the histogram as histogram data HD to the outside, but in order to decrease the data amount and to facilitate utilization thereof, it is also possible to output to the outside only a characteristic parameter or characteristic parameters representing the shape of the histogram, as extracted from the histogram data HD in the controller 10.

Figure 3:
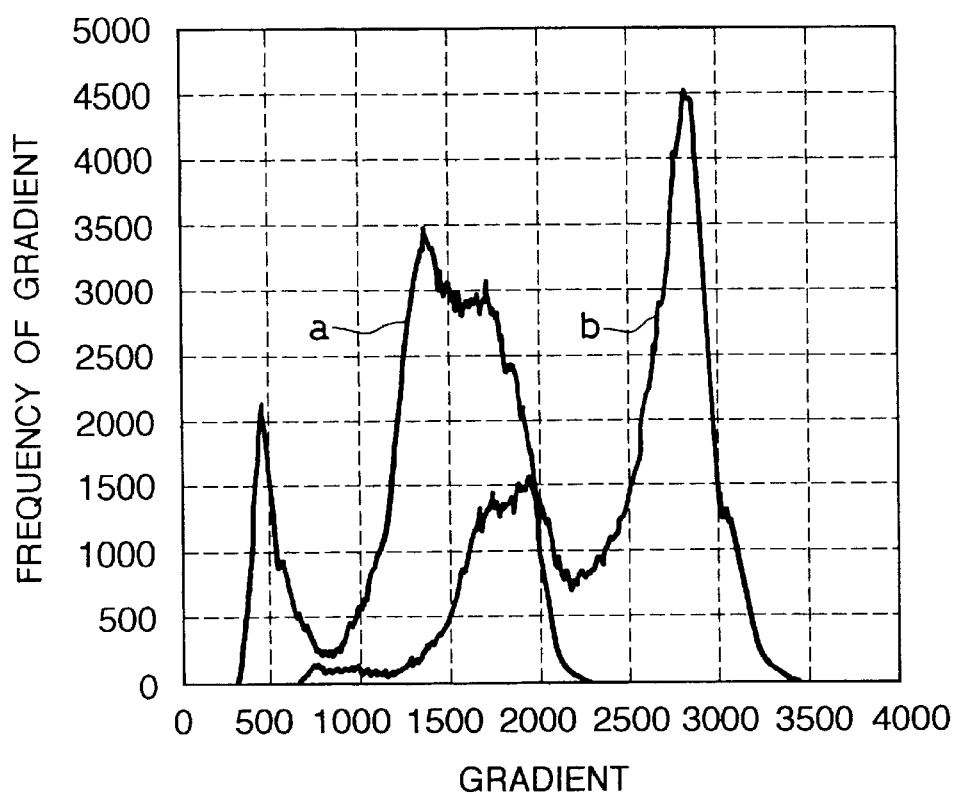
FIG. 3 is a specific example of a histogram.

FIG. 3 is a graph to show histograms, in which the abscissa indicates gradients of 0 to 4095 and the ordinate frequencies of the respective gradients and in which histograms a and b are those obtained from two types of different images. As shown, the histograms do not have simple shapes like a unimodal shape, but have considerably different shapes between images. Accordingly, it is difficult to uniquely determine a parameter or parameters for expressing the shape of the histogram, but they may be extracted depending upon the purpose of use. For example, the parameter or parameters may be (1) a mean and variance of the histogram or a standard deviation obtained from them, (2) a mode representing a maximum frequency of the histogram, (3) a width and median of the histogram, (4) a peak value and frequency thereof which are roughly taken, etc.

Since the present embodiment produces only the histogram, a look-up table has to be produced in the external arithmetic device in order to display a good-contrast image. The apparatus can also be, however, arranged in such a manner that the look-up table optimal to display image data is produced in the controller 10 in the present apparatus, based on the histogram data HD taken from the histogram memory 9. Then, outputting the look-up table with the image data to the external device, it becomes possible to display a good-contrast image with good efficiency. The look-up table may be produced depending upon the purpose of use. For example, a look-up table simply will expand gradations of the histograms a, b as shown in FIG. 3 in the direction of the abscissa so as to spread throughout the entire gradient range.

Figure 4:
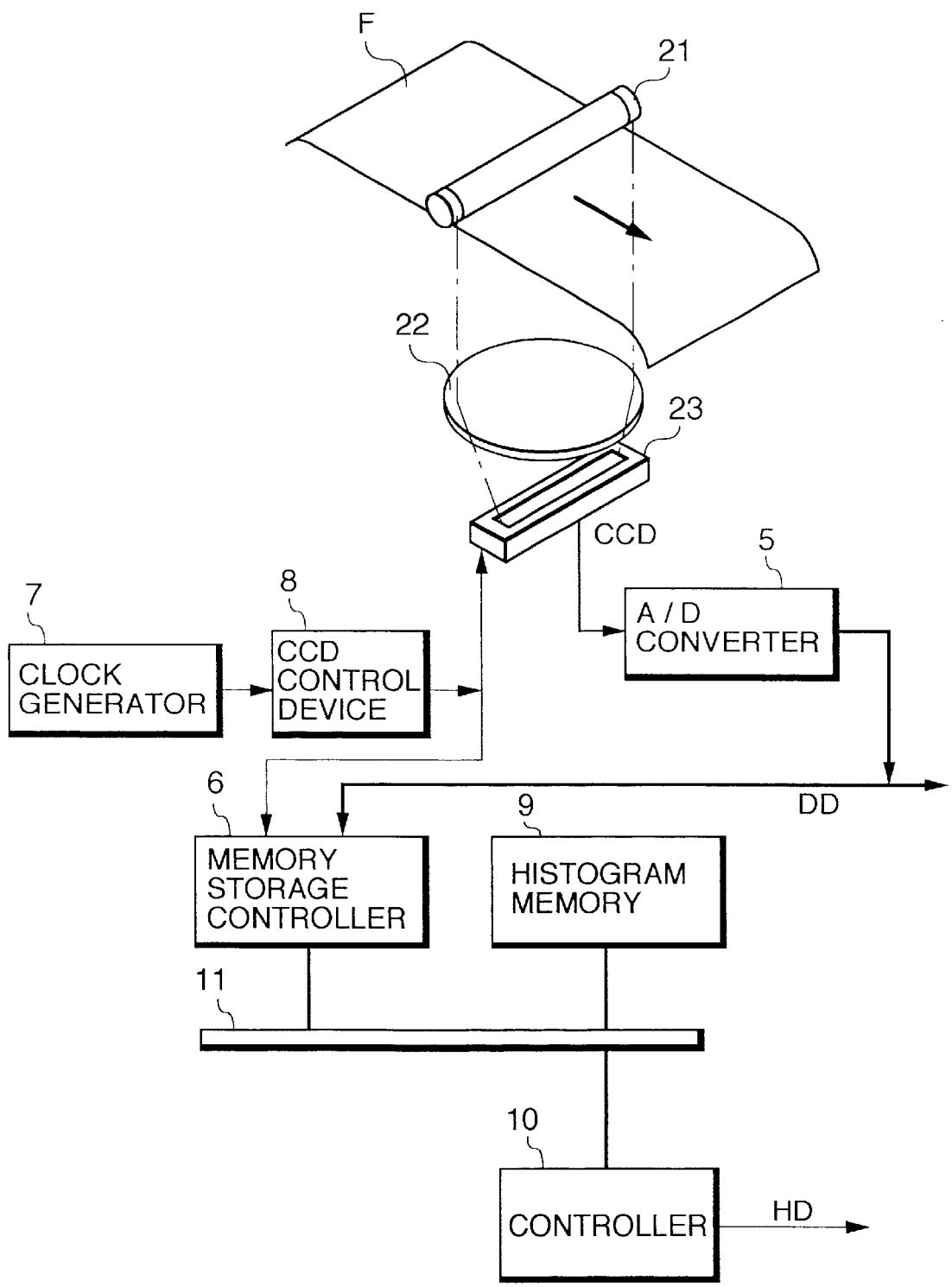
FIG. 4 is a structural drawing of a second embodiment.

FIG. 4 is a structural drawing of another embodiment, which is an image reading apparatus for optically reading an image on an X-ray film taken and developed, different from the embodiment shown in FIG. 1, but having the same circuitry for signal processing as that in the embodiment shown in FIG. 1.

A transmission-type X-ray film F, an optic lens 22, and a CCD line sensor 23 are arranged in order in the direction of emission from a light source 21 such as a fluorescent lamp or a halogen lamp. An output of the CCD line sensor 23 is connected in the same manner as the CCD image sensor 4 shown in FIG. 1.

Light from the light source 21 is transmitted by the X-ray film F and then is condensed by the optic lens 22 to be focused on the CCD line sensor 23. Since the X-ray film F is successively carried in the direction of the arrow by a carrier, not shown, the CCD line sensor 23 receives a linear image extending in the direction perpendicular to the carrying direction, i.e., an image on the film passing through the portion represented by the chain lines. Accordingly, the X-ray film F is scanned by the CCD line sensor 23 whereby the entire image is read in.

During this period, the CCD control unit 8 produces control pulses, based on the basic clock from the clock generator 7. In synchronization with the control pulses, the X-ray film F is carried, charges stored in the CCD line sensor 23 are output as voltage values to the A/D converter 5, the A/D converter 5 converts the voltage values to the digital data DD, the histogram is produced in the same manner as in the above embodiment, and the controller 10 outputs the histogram data with the image data to the outside.

Since the X-ray image detecting apparatus and image reading apparatus of the embodiments as described above can produce information concerning the histogram and output it with image data to the external device, they can eliminate the time and operation for producing the histogram in the external device and can effeciently handle a significant number of medical images.

Figure 5:
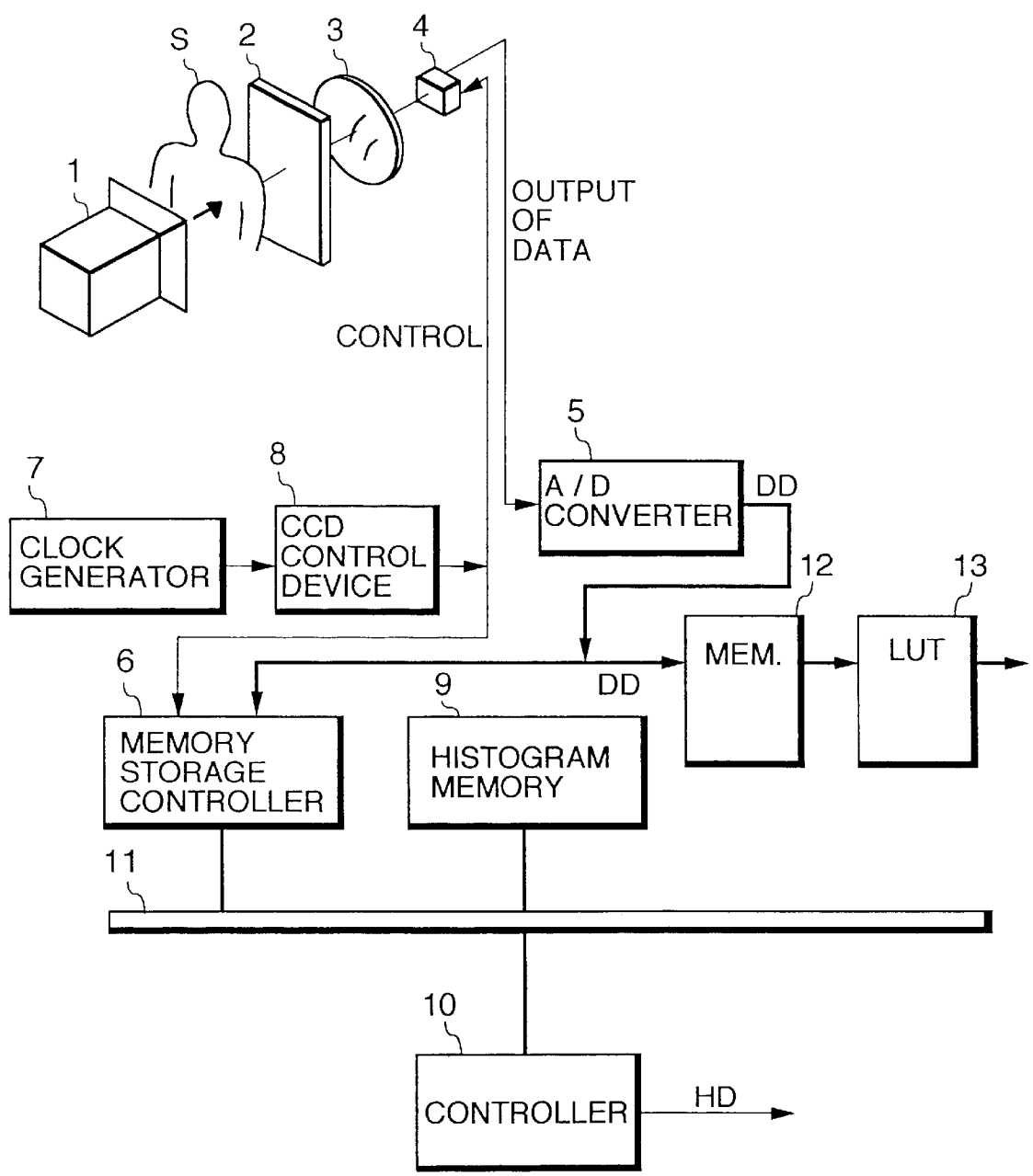
FIG. 5 is a structural drawing of a third embodiment.

FIG. 5 is a structural drawing of an X-ray image detecting apparatus according to the third embodiment of the present invention. The present embodiment is constructed substantially in the same structure as the first embodiment except that the apparatus of the present embodiment produces a look-up table based on the histogram data and also performs conversion to digital values for gradation processing of image data based on the look-up table.

The present embodiment is explained by reference to the drawings, including a partly redundant description.

In the irradiation direction (represented by the arrow) of X-rays generated by the X-ray generator 1, the fluorescent screen 2, optic lens 3, and CCD image sensor 4 are arranged in order on the opposite side to the X-ray generator 1 with respect to the subject S.

The output of the CCD image sensor 4 is connected through the A/D converter 5 to an image memory 12 and the memory storage controller 6, and the output of the image memory 12 is connected through a gradation-processing look-up table 13 to the interface to the external device.

Outputs of the clock generator 7 for generating the basic clock, and the CCD control unit 8 are connected in series to the input side of the CCD image sensor 4, and the output of the CCD control unit 8 is also connected to the memory storage controller 6.

Further, the memory storage controller 6, histogram memory 9, the controller 10 for controlling the entire system, the image memory 12, and the look-up table 13 are connected to each other through the signal bus 11.

The CCD image sensor 4 has about six million pixels, a A/D converter 5 has the 12-bit configuration, and a histogram memory 9 has the 24-bit configuration and 4096 addresses. These addresses correspond to respective gradients, and numerical values stored in the addresses correspond to frequencies of digital values corresponding to the gradients.

The image memory 12 has a capacity of 2000×3000×12 bits, and a look-up table 13 has the 12-bit configuration and 4096 addresses.

In order to read in an X-ray image as digital data, the controller 10 first outputs a control signal through the signal bus 11 to the histogram memory 9 to initialize all numerical values stored in the histogram memory 9 to zero, and thereafter drives the X-ray generator 1 to generate X-rays. X-rays transmitted by the subject S irradiate the fluorescent screen 2, and then the fluorescent screen 2 emits beams of fluorescence proportional to intensities of the X-rays. The beams of fluorescence are condensed by the optic lens 3 to be received by the CCD image sensor 4, which stores charges according to the received beams.

The CCD control unit 8 outputs the control pulses to the CCD image sensor 4 and the memory storage controller 6 in synchronization with the basic clock from the clock generator 7. In the CCD image sensor 4, the charge amounts in the respective pixels are output as voltage values, one for every control pulse, to the A/D converter 5, and the A/D converter 5 converts each voltage value to digital data DD indicating a certain numerical value. The digital data DD is sent to the image memory 12, which stores the data and also outputs it as address values to the memory storage controller 6.

The memory storage controller 6 controls the signal bus 11 to read data from the same address in the histogram memory 9 as an address of each address value in synchronization with the control pulses from the CCD control unit 8, and adds 1 to this data and again writes the result in the same address. Numerical values accumulated in the respective addresses in the histogram memory 9 correspond to frequencies of the gradients represented by the addresses. Accordingly, an image obtained through the CCD image sensor 4 is converted into a digital image, and at the same time, the histogram memory 9 produces the histogram.

After reading the X-ray image, the controller 10 reads the histogram data HD stored in the histogram memory 9, writes look-up table data in the look-up table 13, based on the histogram data HD, and then outputs the image data held in the image memory 12 to the external interface after data conversion through the look-up table 13.

Since the apparatus of the present embodiment has the functions to produce the histogram data from the image data and to determine the look-up table data from the histogram data and is arranged to output to the external device the image data after digital conversion referring to the look-up table data, the load on the external device is greatly decreased, the operation efficiency is more improved, and the processing speed is increased.

In the present embodiment the charge amounts obtained by the CCD image sensor 4 are directly converted into the digital data DD, but they may be converted into the digital data DD after effecting correction of light-quantity unevenness of the fluorescent screen 2, optic lens 3, etc., and correction of variations in conversion efficiency between the pixels in the CCD image sensor 4.

The A/D converter 5 can be selected not only from those handling 12-bit digital values, but also from those handling an arbitrary-number-of-bits of digital values. Further, the number of bits of the histogram memory 9 does not always have to be 24 bits. In most cases, a sufficient number is about 16 bits, and thus, the number of bits of the histogram memory 9 can be decreased to this level of bit number. With the thus decreased bit number, the digital values may overflow in the histogram memory 9, and become saturated, which will rarely affect the shape of histogram. The capacity of the image memory 12 does not always have to be 2000×3000×12 bits, but may be determined to be an arbitrary capacity depending upon the size of the image, the number of images, etc. Further, the number of bits of the look-up table 13 does not always have to be 12 bits, but can be set to an arbitrary number of bits matching the number of necessary gradients.

In the present embodiment, an address in the histogram memory 9 is used for one digital data DD, but the present invention is not limited to such a relation of correspondence. For example, a mean value may be obtained from each 50 or so digital data DD for one gradient. The histogram can be produced using such mean values as address values, whereby an amount of histogram data HD can be greatly decreased while rarely damaging the shape of the histogram.

Although this embodiment produced the histogram of the entire image obtained by the CCD image sensor 4, the histogram may be produced by only an image of a portion necessary for diagnosis in order to decrease the data amount of histogram data HD, as relative to FIG. 2, and it can also be used for the look-up table.

Further, the present embodiment can output the information concerning the histogram, such as the look-up table data and the histogram data HD, as the data having been used in the gradation processing, to the external device as added to the image or separated from the image.

Further, in order to decrease an amount of this data and to facilitate use thereof, the controller 10 may be arranged to extract only a characteristic parameter or characteristic parameters representing the shape of the histogram from the histogram data HD to output it or them, as described relative to FIG. 3.

The apparatus may also have an additional function to output to the external device the information concerning the histogram, or the look-up table data before the image data. In this case, the look-up table can be preliminarily prepared in the external device, and the image data can be taken in not through the look-up table in the apparatus, but through the look-up table in the external device. This can reduce the size of a memory for temporarily holding the image in the external device, the time for producing the information concerning the histogram, etc.

Figure 6:
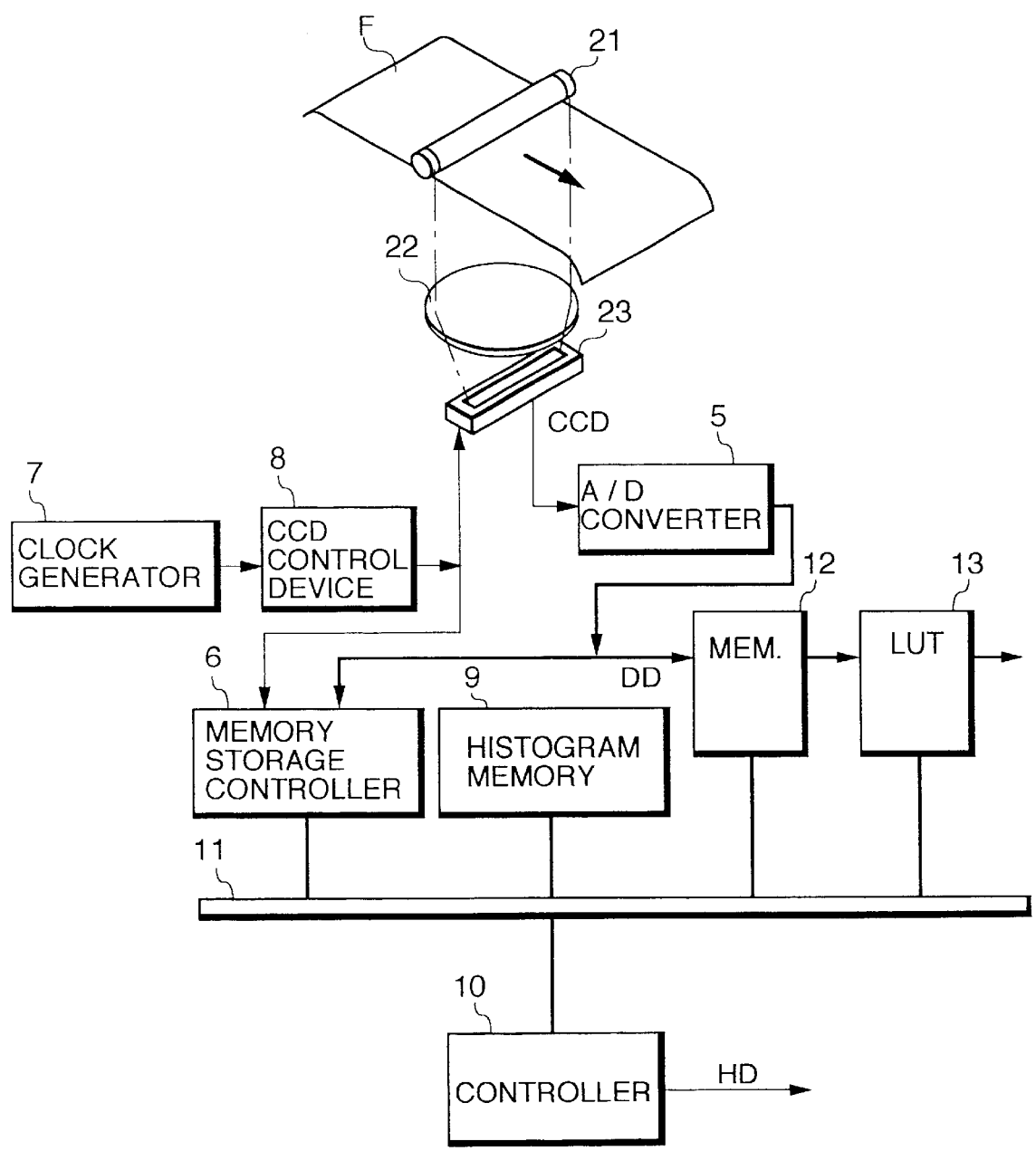
FIG. 6 is a structural drawing of a fourth embodiment.

FIG. 6 is a structural drawing of another embodiment. Different from the embodiment shown in FIG. 5, the present embodiment is an image reading apparatus for optically reading an image on an X-ray film taken and developed, similar to the embodiment of FIG. 4. However, the signal processing circuitry is the same as that in the embodiment shown in FIG. 5.

In the direction of emission from the light source 21, such as a fluorescent lamp or a halogen lamp, the transmission-type X-ray film F, optic lens 22, and CCD line sensor 23 are arranged in order. The output of the CCD line sensor 23 is connected in the same manner as the CCD image sensor 4 shown in FIG. 5.

The light from the light source 21 is transmitted by the X-ray film F and then is condensed by the optic lens 22 to be focused on the CCD line sensor 23. Since the X-ray film F is successively carried in the direction of the arrow by a carrier, not shown, the CCD line sensor 23 receives a linear image in the direction perpendicular to the carrying direction, i.e., an image on the film passing the portion indicated by the chain lines. Accordingly, the X-ray film F is scanned by the CCD line sensor 23 whereby the entire image is read in.

During this period, the CCD control unit 8 produces the control pulses, based on the basic clock from the clock generator 7. The X-ray film F is carried in synchronization with the control pulses, and the CCD line sensor 23 outputs charges stored therein as voltage values to the A/D converter 5, which converts the voltage values to the digital data DD.

Further, the histogram is produced in the same manner as in the above embodiments, the controller 10 writes the look-up table data based on the histogram data in the look-up table 13, and the image data held in the image memory 12 is output through the look-up table 13 to the external interface.

Since the X-ray image detecting apparatus and image reading apparatus according to the embodiments as described above are arranged to produce the information concerning the histogram, to produce the look-up table based on the histogram data, to perform the gradation processing in the apparatus, and to output the image data after gradation processing to the external device, it can eliminate the operation and time for processing the histogram in the external device and the operation and time for performing the gradation processing of image data, and it can efficiently handle a significant number of medical images and at low cost.

What is claimed is:

1. An image-reading apparatus for reading an image, comprising:
   an image reading portion for outputting image data of an image read; and
   a signal processing portion for receiving the image data from said image reading portion and outputting a signal to an apparatus which is external to said image-reading apparatus, and having a function of processing the output image data, said signal processing portion comprising:
   (i) an image data transmitting system for transmitting the image data from said image reading portion;
   (ii) a histogram system for producing data concerning a histogram from the image data from said image reading portion; and
   (iii) a histogram transmitting system for transmitting the data concerning the histogram produced by said histogram system,
   wherein the information concerning the histogram is transmitted prior to transmission of the image data.

2. An image-reading apparatus according to claim 1, wherein said histogram system produces data of a parameter concerning a shape of the histogram of the image data as said data concerning the histogram.

3. An image-reading apparatus according to claim 1, wherein said histogram system produces data concerning a histogram of a part of said image data.

4. An image-reading apparatus according to claim 3, wherein said histogram system produces a histogram with a number of data fewer than a number of data from said image reading portion.

5. An apparatus according to claim 1, wherein the data concerning the histogram produced by said histogram system is transmitted in parallel with said image transmitting system.

6. An apparatus according to claim 1, wherein said image data transmitting system and histogram transmitting system have interface means for outputting the image data and the data concerning the histogram to the external apparatus.

7. An apparatus according to claim 1, wherein said histogram system produces data of the histogram itself of the image data as said data concerning the histogram.

8. An apparatus according to claim 1, wherein said histogram system produces data of a look-up table for image display as said data concerning the histogram.

9. An apparatus according to claim 1, wherein said image to be read is an X-ray image on an X-ray film taken and developed.

10. An apparatus according to claim 1, wherein said image to be read is an X-ray image taken by an image sensor.

11. An apparatus according to claim 1, wherein said histogram system produces data concerning a histogram from the image data from said image reading portion, with reading by said image reading portion.

12. An image-reading apparatus for reading an image, comprising:
   an image reading portion for outputting image data of an image read; and
   a signal processing portion for receiving the image data from said image reading portion and outputting a signal to an external apparatus, which is external to said image-reading apparatus, for accepting converted image data, said signal processing portion comprising:
   (i) a histogram system for producing data concerning a histogram from the image data from said image reading portion; and (ii) a data converting system for converting the image data from said image reading portion, based on the data concerning a histogram produced by said histogram system, wherein the image data converted by said data converting system is output to the external apparatus, and the data concerning a histogram is output to the external apparatus, and is added to or separated from the image data converted by said data converting system.

13. The apparatus according to claim 12, wherein said histogram system comprises histogram data producing means for producing histogram data of said image data, and produces a look-up table data for image display, based on the histogram data of the image data produced by said histogram data producing means.

14. The apparatus according to claim 13, wherein said histogram data producing means produces data of a histogram itself of the image data as said histogram data.

15. The apparatus according to claim 13, wherein said histogram data producing means produces data of a parameter concerning a shape of a histogram of the image data as said histogram data.

16. The apparatus according to claim 13, wherein said histogram data producing means produces histogram data of a part of said image data.

17. An apparatus according to claim 12, wherein said histogram system produces a histogram with a number of data fewer than a number of data from said image reading portion.

18. An apparatus according to claim 12, wherein said image to be read is an X-ray image on an X-ray film taken and developed.

19. An apparatus according to claim 12, wherein said image to be read is an X-ray image taken by an image sensor.

20. An apparatus according to claim 12, wherein said histogram system produces data concerning a histogram from the image data from said image reading portion, with reading by said image reading portion.

* * * * *

UNITED STATES PATENT AND TRADEMARK OFFICE
CERTIFICATE OF CORRECTION

PATENT NO.   : 6,282,306 B1
DATED        : August 28, 2001
INVENTOR(S)  : Hitoshi Inoue et al.

Page 1 of 1

It is certified that error appears in the above-identified patent and that said Letters Patent is hereby corrected as shown below:

<u>Title page,</u>
Item [30], Foreign Application Priority Data, insert:
-- Sept. 8, 1995 (JP) ………………………………….. 7-256957 --.
Item [56], References Cited, FOREIGN PATENT DOCUMENTS, insert:
-- 560165  9/1993  (EP) --.
Item [56], References Cited, U.S. PATENT DOCUMENTS
"Nyg.ang.rd" should read -- Nygård --.

<u>Column 1,</u>
Line 12, "attempt" should read -- attempts --;
Line 16, "a" (2nd occurrence) should read -- an --; and
Line 17, "a" should read -- an --.

<u>Column 2,</u>
Line 42, "the" should read -- a -- and, "a" should read -- the --.

<u>Column 5,</u>
Line 39, "the" should read -- a --; and "a" should read -- the --;
Line 40, "the" should read -- a --; and
Line 46, "a" should read -- the -- and, "the" should read -- a --.

<u>Column 8,</u>
Line 29, "claim 3," should read -- claim 1, --.

Signed and Sealed this

Twenty-third Day of July, 2002

*Attest:*

JAMES E. ROGAN
*Attesting Officer*     *Director of the United States Patent and Trademark Office*